United States Patent

[11] 3,559,795

[72] Inventor Achille Talenti
 No. 105, Via Dario Niccodemi, Rome, Italy
[21] Appl. No. 737,218
[22] Filed June 14, 1968
[45] Patented Feb. 2, 1971
[32] Priority July 29, 1967
[33] Italy
[31] 38,519/A67

[54] DEVICE FOR EFFECTING THE CHARGING OF NONCOHESIVE LOOSE MATERIAL
 3 Claims, 10 Drawing Figs.
[52] U.S. Cl. .................................................. 198/43,
 198/211, 214/83.32, 214/507
[51] Int. Cl. .................................................. B65g 33/20
[50] Field of Search .......................................... 214/507,
 83.32; 222/412, (cursory); 198/43, 211, (cursory)

[56] References Cited
UNITED STATES PATENTS
3,104,022 9/1963 Schaffler et al. ............ 214/507
3,204,789 9/1965 Riedl et al. ................. 214/83.32

Primary Examiner—Laverne D. Geiger
Assistant Examiner—Richard J. Sher
Attorney—Holman, Glascock, Downing and Seebold ABSTRACT: A device for charging materials in stationary or rotating receptacles or tanks including a vertical panel provided with a charging aperture and applied to a wall of the receptacle, a short cylindrical surface rotatable about a horizontal axis, mounted on the panel and surrounding the charging aperture, and a shell-like contoured concave surface fixed to the panel in front of the charging aperture and extending towards the receptacle.

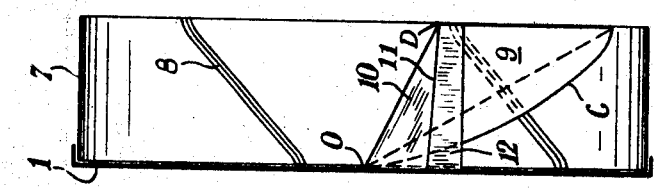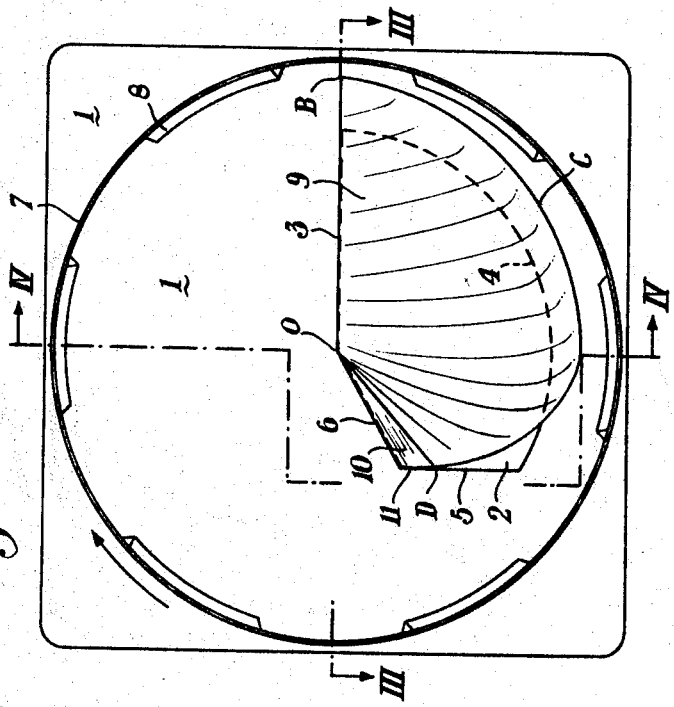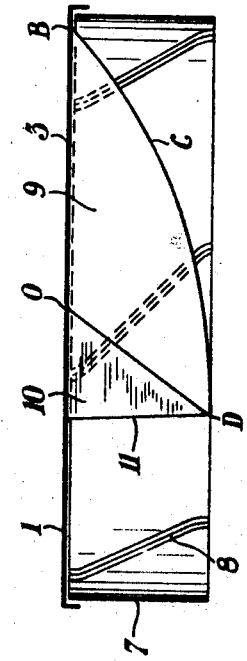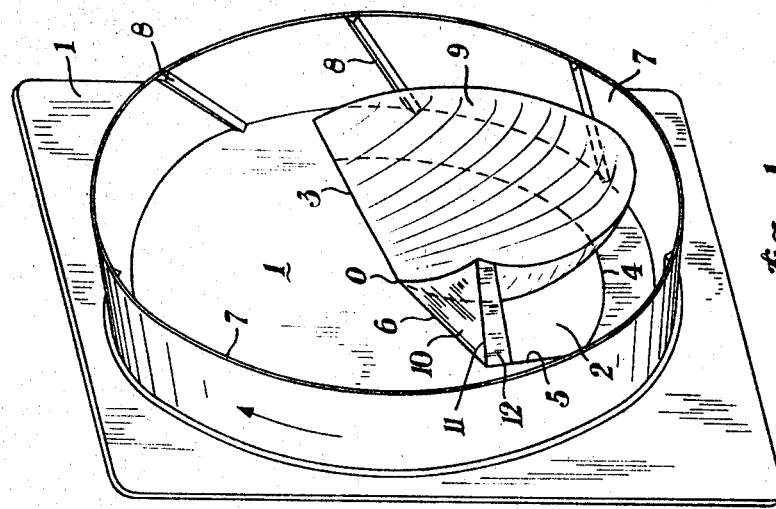

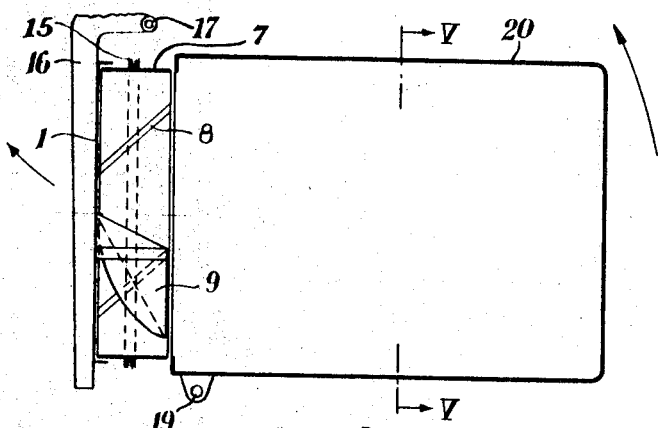
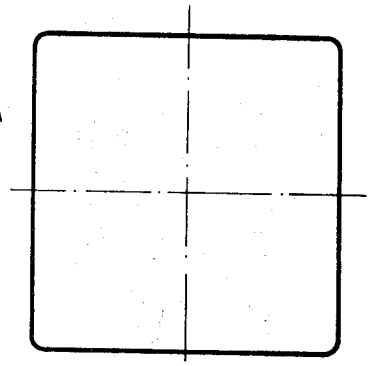
*Fig. 5*  *Fig. 5A*
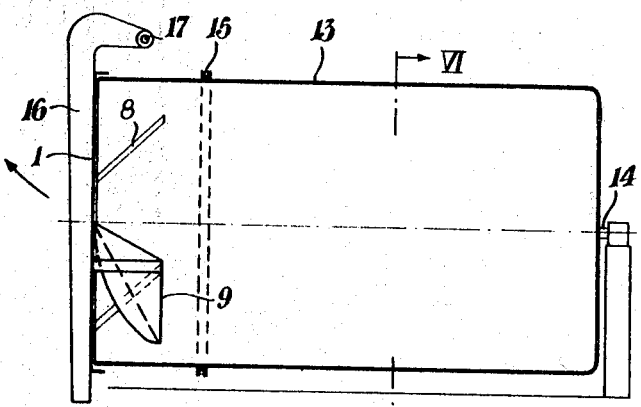
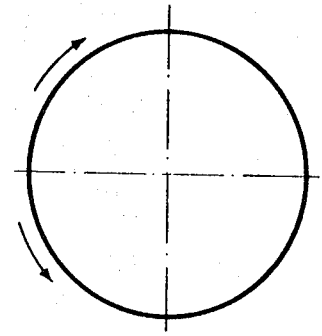
*Fig. 6*  *Fig. 6A*
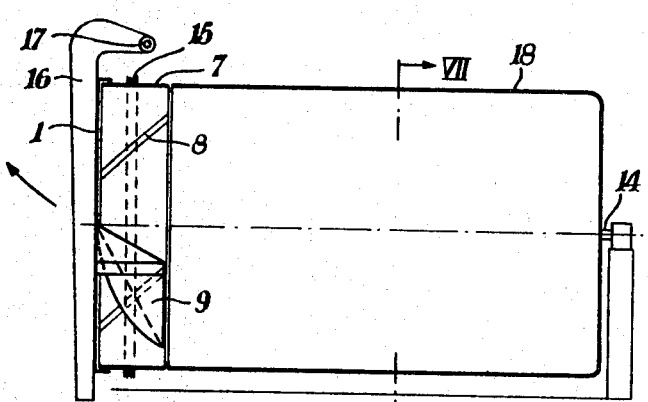
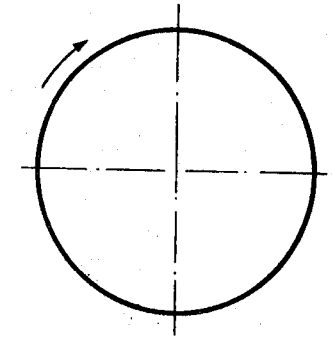
*Fig. 7*  *Fig. 7A*

DEVICE FOR EFFECTING THE CHARGING OF NONCOHESIVE LOOSE MATERIAL

BACKGROUND OF THE INVENTION

The present invention relates to an improved device for effecting the charging of noncohesive loose material, e.g. refuse, into fixed or rotary containers of any shape and dimensions.

Devices have already been designed and manufactured for charging loose material into a container without any appreciable exchange of air taking place between the container interior and the external atmosphere.

Such a device is found particularly necessary in cases where the material for charging comprises solid refuse or where it is necessary to avoid the spread of dust and other impurities which might carry harmful bacteria. These devices are in general rather complicated and costly, and are easily subject to breakdowns.

The invention proposes to provide a device of the type mentioned above, adapted to overcome the problems mentioned, from the aspects of both operation and design.

SUMMARY OF THE INVENTION

The device in accordance with the invention provides in combination a vertical panel having a charging aperture and, mounted on the base or a wall of the container, a short cylindrical surface adapted to rotate about a horizontal axis on the internal face of the panel and surrounding the charging aperture, and a concave shell-shaped surface affixed to the inner face of the panel in front of the charging aperture and projecting towards the interior of the container.

The shell-shaped surface has its concave portion turned towards the container interior, and is engendered by a segment initially straight then becoming curved and finally straight again, and inclined at a suitable angle relative to the container axis, with one end of this segment coinciding with the axis of the rotary cylindrical surface and its other end describing a development of a circle: during these changes the segment which determines the shape described above has its angle of incidence modified relative to the axis of the rotary cylindrical surface until being again applied to the interior face of the panel. Consequently, the perimeter of the shell-shaped surface thus engendered extends from the vertical wall of the panel towards the container interior in correspondence with the direction of rotation of the rotary cylindrical surface.

BRIEF DESCRIPTION OF THE DRAWINGS

The invention is described below with reference to the attached drawings which show, by way of illustrative but non-limiting example a preferred embodiment of said invention.

In these drawings:

FIG. 1 is a perspective view of the device of the invention, the point of view being located within the container;

FIG. 2 is a front view corresponding to FIG. 1;

FIG. 3 is a section on line III–III of FIG. 2;

FIG. 4 is a side view, partly in section, on line IV–IV of FIG. 2;

FIGS. 5, 6 and 7 show diagrammatically various applications of the device to different types of fixed or rotary containers; and FIGS. 5A, 6A, 7A are the respective sections on lines V–V, VI–VI and VII–VII of FIGS. 5, 6, 7.

DETAILED DESCRIPTION OF THE INVENTION

As shown in FIGS. 1—4, the device in accordance with the invention comprises a panel 1 which is applied to the base or to one wall of the container being charged (not shown). In panel 1 is formed a charging aperture 2 having a multilinear contour, defined by a straight horizontal edge 3, a curved edge 4 and two connecting edges 5, 6.

On the internal face of panel 1, i.e. the face turned towards the container interior, is mounted a cylindrical surface 7 of relatively small axial length, disposed to rotate about its geometric axis in the direction indicated by the arrow in FIGS. 1 and 2.

The cylindrical surface 7 surrounds the charging aperture 2 and has on its inner face a series of ribs or flanges 8 disposed on the generating lines of surface 7 or inclined relative thereto. These ribs 8 may be replaced by corrugations or roughened areas distributed along the inner surface of rotary member 7.

In a position corresponding substantially to that of charging aperture 2 there is mounted on the inner face of panel 1 a concave surface 9 of generally shell shape, projecting towards the interior of rotary member 7, with its concave portion turned towards the container interior.

The shape of the concave surface 9 cannot be precisely defined in geometric terms: it is engendered by a segment initially straight (and thus coinciding substantially with edge 3 of the charging aperture), becoming curved and then straight again, with one end of this segment passing through the axis of rotation O. The other end B of the edge 3 moves along a trajectory developed from circle C, ahead of the plane of the panel, with the angle of incidence of edge 3 relative to the latter continually changing until said segment reaches the position D. The surface is completed by a connecting sector 10 which forms a ridge 11 substantially perpendicular to the plane of panel 1 and by a strip 12.

The device thus formed operates as follows:

At the start of the charging operation, the material introduced through aperture 2 falls on the rotary cylindrical surface 7 and thence into the container. The ribs 8 or the roughened areas on the surface 7 aid the feeding into the container.

When the material fed into the container has reached a certain level, because of the action of rotary surface 7 there is formed in the material a rotary movement which only affects material immediately adjacent panel 1. Through the action of the shell-shaped surface 9 this material is given a rotary motion whereby the material is progressively moved towards the interior of the container, following an axial thrust combined with components in every direction. This "eddy," a core of material which turns in the direction of rotation of surface 7, applies the thrust to the material proceding it, causing it to move towards the wall opposite that with the panel 1 and to expand radially. Complete filling of the container is progressively effected as the introduction of material continues. Because the thrust effect operates in all directions as stated above, the container may be either fixed or rotary. The containers may be of any shape, of square cross section, rectangular, polygonal, circular, etc.

FIGS. 5—7 show various applications of the device described above, which is particularly well adapted to containers mounted on vehicles, it being, however, understood that the device in question may also be applied to a container forming part of a fixed installation.

In FIGS. 5 and 5A the device is applied to a fixed reservoir 20 which can be emptied by tilting about a pivot 19.

The charging assembly is carried by arms 16 pivoted at 17 to enable the container to be opened before it is tilted.

In the example in FIGS. 6 and 6A, the cylindrical surface 7 of FIG. 1 comprises the actual wall of container 13 which has the ribs 8 and rotates about pivot 14. The rotary drive is effected by means of a toothed crownwheel 15 affixed about the container and integral therewith, and a pinion (not shown) engaging with the crownwheel. The panel 1 is carried by a stirrup 16 pivoted at 17. For emptying the container, the panel 1 is caused to tilt about pivot 17, and the container is then caused to rotate in the opposite direction to that for charging, as shown by the two arrows in FIG. 6A.

FIGS. 7 and 7A show a container 18 of circular cross section, comprising the continuation of the cylindrical surface 7 already described. Emptying of the container is effected by rotating it in the direction shown in FIG. 7A, after first tilting panel 1 and the assembly associated therewith about pivot 17.

The present invention has been described above in one of its preferred embodiments, but it will be understood that modifications in design may be incorporated by any specialist in this field while remaining within the scope of the invention.

I claim:

1. A device for charging material into a container, comprising a vertical panel having a charging aperture, a cylindrical surface mounted on said vertical panel for rotation about a horizontal axis and surrounding said charging aperture, a stationary shell-shaped plate rigidly affixed to the vertical panel within the limits of said cylindrical surface, said shell-shaped plate having an inner concave surface obliquely upwardly facing toward the interior of the container and a lower edge defining with the inner lower surface of the cylindrical surface a free passage aperture for the material.

2. The material charging device as claimed in claim 1 in which the distance of the edge of said shell-shaped plate from the inner surface of the cylindrical surface increases in the direction of rotation of the cylindrical surface.

3. The material charging device as claimed in claim 2 in which the edge of the inner concave surface is defined by rotating an initially straight line segment about an end coinciding with the axis of rotation of the cylindrical surface in the plane of the vertical panel in the direction of rotation of the cylindrical surface and during such rotation progressively moving the other end of the segment away from the panel and downwardly inflecting the segment, and a connecting end sector between the concave surface and the vertical panel.